Patented Nov. 28, 1922.

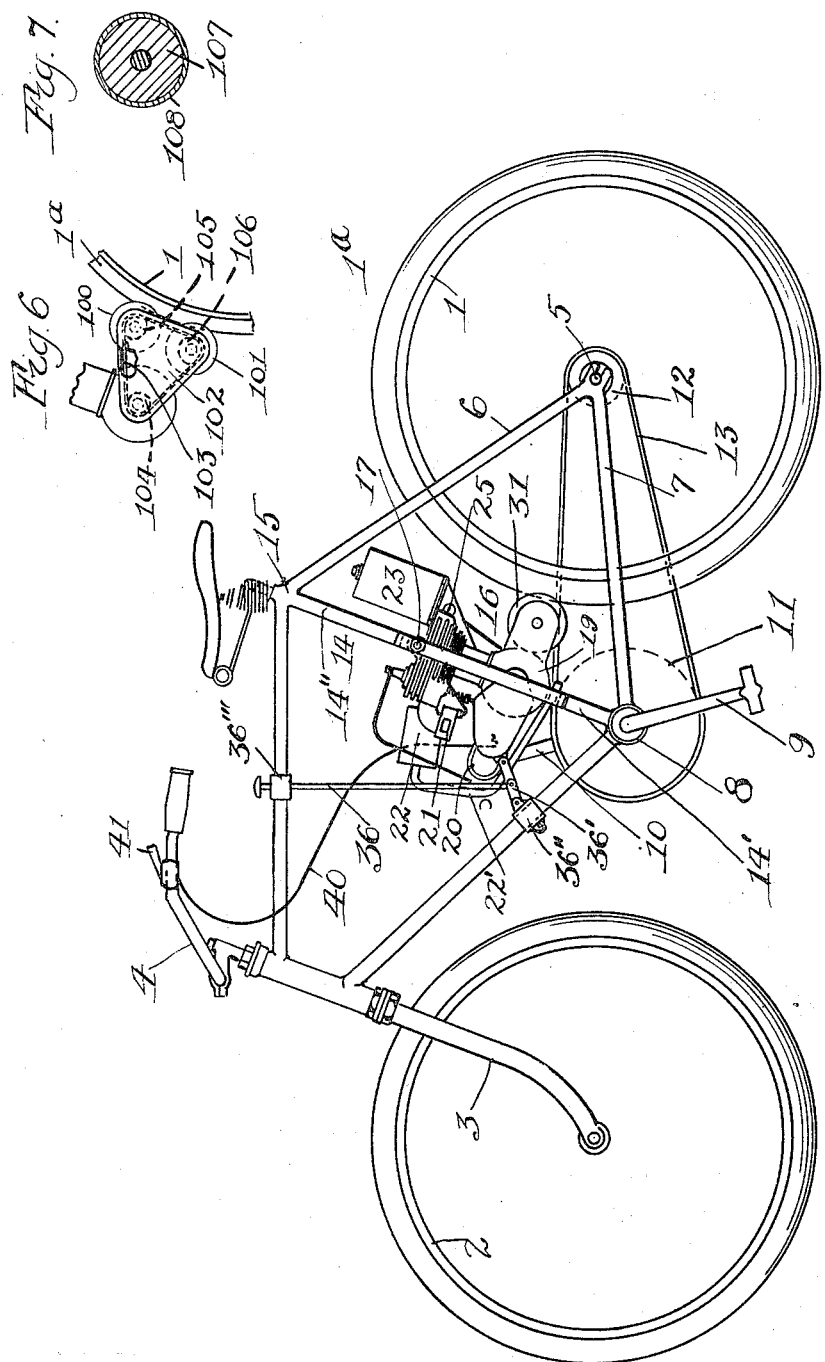

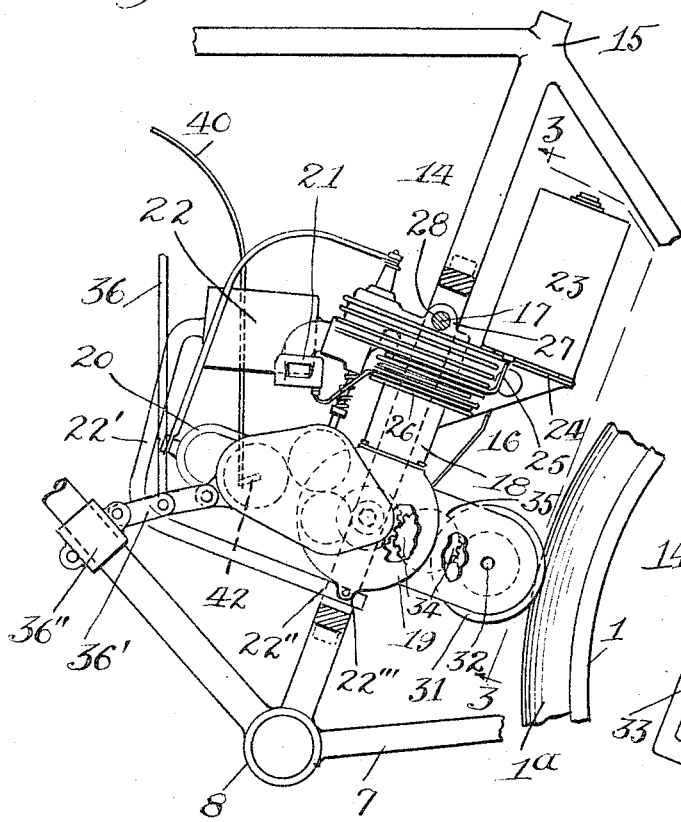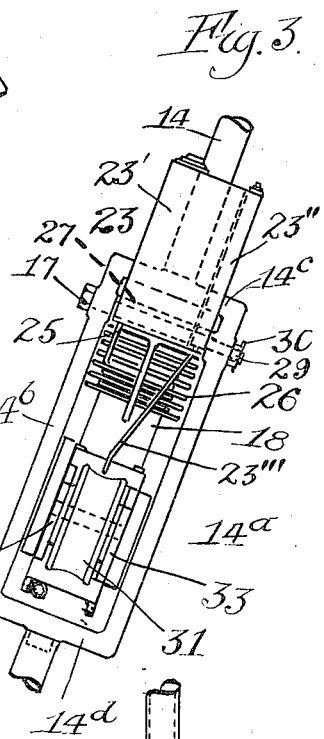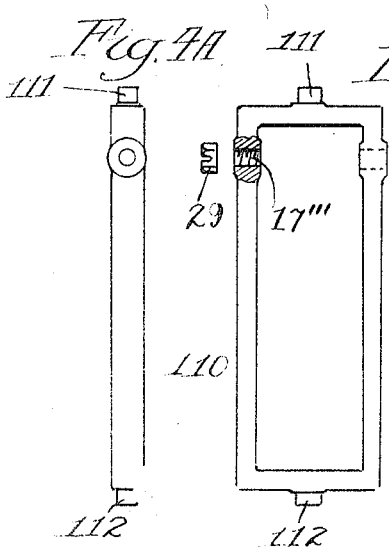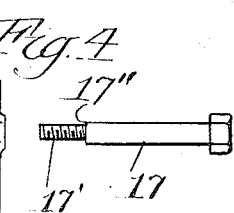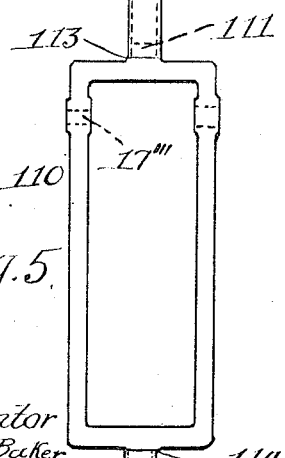

1,436,788

UNITED STATES PATENT OFFICE.

ERLE K. BAKER, OF CHICAGO, ILLINOIS.

BICYCLE AND MOTOR DRIVE THEREFOR.

Application filed December 17, 1918. Serial No. 267,140.

*To all whom it may concern:*

Be it known that I, ERLE K. BAKER, a citizen of the United States, and a resident of Chicago, Cook County, Illinois, have invented certain new and useful Improvements in Bicycles and Motor Drives Therefor, of which the following is a specification.

My invention relates generally to improvements in motocycles and relates more particularly to improvements in motorcycles of the bicycle type.

One object of my invention is to provide a light, durable motor bicycle of such construction that it can be operated as an ordinary bicycle or as a motor bicycle at the will of the operator.

Another object of my invention is to provide a bicycle of such construction that it can be equipped with a motor drive, without alteration of the bicycle in any way and by the simplest possible act upon the part of the operator.

Again, it is an object of my invention to provide a motor driven bicycle, wherein the drive shall act in the central plane of the wheel thereby eliminating objectionable torsional or canting action upon the axle of the drive wheel prevalent in such detrimental manner in all off-center drives; thereby enabling the use of a bicycle of much lighter and cheaper construction than would otherwise be safe for such purposes.

A further object of my invention is to provide a motor bicycle of such construction that the entire power plant, including carburetor, magneto, and fuel tank, can be removed as a unit by the mere act of removing a single bolt, thereby restoring the vehicle to the form of an ordinary bicycle.

It is also an object of my invention to provide means whereby an ordinary bicycle of usual construction can be converted, in a simple and easy manner, into a bicycle adapted to the reception of my unit power plant.

My invention consists generally in the form, construction, arrangement, and combination of parts, whereby the above named objects, together with others that will appear hereinafter, are attained; and my invention will be more readily understood by reference to the accompanying drawings wherein:

Fig. 1 is a side elevation of a bicycle, and a motor drive therefor, embodying my invention, Fig. 2 is an enlarged view of my unitary power plant as applied to a bicycle.

Fig. 3 is a view substantially on the line 3—3 of Fig. 2.

Fig. 4 is a detail view, showing in assembling relation, parts for converting a bicycle of usual construction into one adapted to the reception of my unit power plant.

Fig. 4A is a side view of the yoke member shown in Fig. 4.

Fig. 5 is a view showing the parts of Fig. 4 assembled.

Fig. 6 is a detail view showing a slightly modified form of my invention; and

Fig. 7 is a sectional view through one of the driving wheels.

I am aware that it has been proposed, heretofore, to convert a bicycle into a motor bicycle in various ways but the proposals hertofore made have met with various practical objections some of which are high centers of gravity; off-center drives; unbalanced construction subjecting the light bicycle parts to destructive torsional strains; difficulties of assembly; and lack of durability. These objections are not fanciful but real, so much so that while a large market awaits a practical motor driven bicycle it has not accepted, in any large measure, devices heretofore devised.

I shall now describe in detail my novel structure which I believe, from practical tests, overcomes the objections heretofore urged against motor driven bicycles.

1 represents the usual rear drive wheel and 2, the front wheel of a bicycle. The front wheel 2 is mounted in the customary manner in a fork 3 which can be manipulated, for steering, by twisting the handle bars 4.

The rear wheel is supported upon an axle 5 mounted in the cluster formed by the upper and rear fork members 6 and 7. The lower fork member 7 is connected to the crank hanger 8 in which are carried, in usual manner, the crank arms 9 and 10 and the sprocket 11. The rear wheel carries a sprocket 12, which in this instance is driven from the sprocket 11 by means of the usual chain drive 13. The bicycle thus far described is of usual form and may be manufactured with the variations prevalent in practice. For example, it will be understood that instead of a chain drive the well known chainless drive may be used, which it is not thought necessary to illustrate.

The seat mast, or frame member 14 is of novel construction and it serves not only to connect or tie the crank hanger 8 to the seat post fitting 15 but it also serves to support, and accommodate centrally an internal combustion engine 16.

The member 14, as here shown, is composed of tubular end portions 14' and 14" which are connected respectively to the crank hanger 8 and to the seat post fitting 15. Intermediate of the ends the member assumes a yoke-like form having substantially vertical side portions 14$^a$ and 14$^b$ joined above and below by transverse portions 14$^c$ and 14$^d$. The yoke portion is preferably made of a drop forging which lends itself admirably to a light small shape of sufficient strength to withstand all of the forces to which it is subjected in use.

Near the upper end of the yoke I provide openings in the side portions for the reception of a bolt 17, on or from which the internal combustion engine 16 is suspended.

Many of the details of the engine 16 need not be described because they may be of usual or desired construction, but the main parts will be designated in order that the completely self contained construction of the power plant, which I much prefer, may be better understood. 18 is the cylinder, 19 the crank case, 20 the magneto, 21 the carburetor, 22 the muffler, and 23 the fuel supply tank. The fuel supply tank is carried directly by the engine, in this instance being mounted upon a bracket 24 cast as an integral part of the engine cylinder 18. A fuel pipe 25 connects the carburetor and the fuel tank and since both the tank and the carburetor are directly attached to the engine, all danger of injuring the fuel connection by relative movement of the parts is prevented.

I also prefer to mount the fuel tank and carburetor upon opposite sides of the engine and wrap the fuel supply pipe several times around the engine cylinder between the radiating fins 26. In this manner the fuel is heated as it flows to the carburetor thereby enabling the ready vaporization of even low grade fuel and greatly increasing the engine efficiency with any kind of fuel in cold weather.

Upon the upper part of the engine cylinder I cast an integral bushing-like lug 27 which is provided with an opening 28 for the reception of the bolt 17 by which the engine is suspended. The lug 27 preferably extends from side to side of the yoke thus forming a relatively long bearing and preventing vibrating and swinging movements of the motor. The bolt 17 is preferably provided with a reduced threaded end portion 17' thus providing a shoulder 17" so that the bolt may be screwed into the threaded opening 17'" of the yoke tightly without danger of drawing the yoke side portions together. I prefer also to provide a castle nut 29 through which a pin 30 passes in well known manner. In this manner the motor or engine is held in place in such manner that it can swing in the central vertical plane of the drive wheel and only in that plane. It will be noted that I have positioned all of the parts in a symmetrical manner on both sides of the central plane so that the engine is nicely balanced and any tendency to overbalance the bicycle is overcome. It will also be seen that the center of gravity of the engine, particularly the lower heavier parts such as the magneto, crank case, fly wheel, gears, and the like, is quite low. This construction not only stabilizes the vehicle in motion but also enables the successful use of a relatively light bicycle as a motor bicycle.

The rear wheel is driven from the engine by means of the friction drive wheel 31 which is mounted for rotation upon a shaft or bearing 32 carried in brackets 33 extending from the crank case of the engine. Rotation is imparted to the wheel 31, from the crank shaft of the engine by means of a gear train 34 arranged in a suitable housing 35. It will be understood that the engine is positioned off the vertical center and that its tendency is to swing to such position. For this reason the weight of the engine acts to hold the drive wheel 31 into contact with the tire 1$^a$ of the rear wheel 1. I do not rely entirely upon this action, however, but provide in addition a lever 36 positioned within convenient reach of the rider which, when thrown in one position, serves positively to move and hold the engine so that the drive wheel 31 is in firm engagement with the tire, and when thrown to the other position serves positively to move the drive wheel and engine away from the tire so that, to all intents and purposes, the vehicle becomes an ordinary bicycle and can be operated in the usual manner. Because the engine parts are relatively light and because the center of gravity is low the bicycle can be easily operated even with the engine in place.

The engine here shown is of the so called one speed type, that is to say, no throttle adjustment is provided for the carburetor. I find that sufficient variations in speed can be attained for a bicycle of this type by advancing and retarding the timer. For manipulating the timer I provide a wire 40 connecting the lever 41, within convenient reach of the operator at one end and the lever 42 of the timer at the other end.

I prefer also to make the muffler and the exhaust pipe an almost integral part of the engine for the reason that unless this be done vibration of these parts is at once annoying and destructive. To this end, as before stated, the muffler is firmly attached to the engine cylinder or exhaust port, and I run the exhaust pipe 22' under the engine and secure the lower end 22" to the crank case as by means of lugs 22''' and suitable fastening devices co-acting therewith.

It will now be understood that to remove the engine from the bicycle it is but necessary to withdraw the single bolt 17, at which time the engine and all of the operating parts carried thereby can be withdrawn by simply angling the engine forwardly until the fuel tank and drive wheel are free of the yoke, at which time the engine can be moved transversely of the frame. When this is done, the bicycle becomes an ordinary bicycle with no additional weight; with no obstructions, and with no unsightly features to mar its appearance and to mark it as a makeshift motor bicycle. To reconvert the bicycle into a motor driven bicycle is of course as simple as the act just described, being a mere reversal thereof, and hence will not be again described. I wish it also to be understood that I propose to manufacture bicycles with my novel yoke construction which may be utilized as a bicycle until the user desires a motor vehicle at which time, without cutting or fitting, my unitary power plant can be installed in the manner already described.

I also provide a means for converting a bicycle of the usual construction having a straight mast or member extending between the crank hanger and the seat post fitting into a bicycle adapted to the reception of my novel power plant, which will be described shortly.

The lever 36 by which the engine is moved into and out of driving position may be connected to the engine in various ways but it is preferably so connected that a powerful leverage can be secured and thereby move the drive wheel thereof into engagement with the rear wheel of the bicycle with pressure sufficient to prevent slippage even when the wheel is wet and slippery. In the present instance, I have illustrated the lever 36 as connected at its lower end to toggle levers 36' which in turn are connected respectively to the engine at one end and to a bracket 36" at the other end, which bracket 36" is clamped to the frame of the bicycle in any suitable manner for convenient removal. The upper end of the lever 36 engages a device 36''' suitably clamped to the cross bar of the frame and which is constructed to hold the lever 36 in any placed position. Thus when the control lever 36 is pressed down the engine is moved into driving position and when it is pulled up the toggle mechanism 36' is "broken" thereby moving the engine out of driving position. It is obvious that by means of the toggle mechanism shown a very powerful force can be exerted to push the engine into driving position.

For some purposes it may be desirable to provide more than one drive wheel for contact with the rear wheel of the bicycle and such a modification is shown in Fig. 6 of the drawings. In this form of my invention two spaced driving wheels 100 and 101 are provided which are rotatably mounted in the double bearing bracket 102 carried by the engine. In this instance a single chain 103 is provided which engages a sprocket 104 carried on the engine shaft and sprockets 105 and 106 carried respectively by the shafts on which the drive wheels 100 and 101 are carried. Obviously the bicycle can be propelled by the motor with less danger of slippage between the drive wheels and the bicycle wheel, or the drive may be effected with less pressure of the drive wheels against the rear wheel of the bicycle due to the larger surface of contact. As is best shown in Fig. 7 the drive wheels may be composed of an inner or body portion 107 and an outer or surface covering 108. The outer or surface covering 108 is composed of a friction material which is not detrimentally affected by moisture and heat and which serves to prevent any tendency of slippage between the drive wheel of the engine and the rear wheel of the bicycle. I wish it to be understood, however, that I do not limit my invention to the use of friction material on the drive wheel as this feature relates only to the surface contact and to the pressure necessary to affectuate a suitable drive.

As heretofore stated I propose to convert bicycles now in use, of the usual construction having a straight mast or member extending between the crank hanger and the seat post, into a bicycle adapted to the reception of my novel power plant. Means for so converting the bicycle are shown in Figs. 4, 4A and 5 of the drawings. In this instance I provide a yoke-like member 110 having at the opposite ends projecting lug-like portions 111 and 112 which are of a size adapted to enter the tubing of which the bicycle mast is composed. These projecting stud lug portions 111 and 112 are relatively short and in the placement of the yoke in a bicycle a section of the mast is cut away at which time the frame can be sprung apart sufficient so that the studs 111 and 112 can be entered into the tubing of the mast at which time a release of the spreading pressure on the frame will allow it to spring back into position firmly clamping the yoke in place as is well shown in Fig. 5. Thereafter the joints 113 and 114 are preferably braced so that the mast becomes again in effect an integral one pieced mast. The yoke is provided with openings in its side portions for the reception of a bolt 17 which is adapted to support the engine. The bolt and openings have been given numbers corresponding to the numbers applied to the principal figures of the drawings since their function and construction is the same.

The engine depicted in the drawings is of the four cycle type but I wish it to be understood that I am not limited to an engine of this type and may employ a two cycle engine. However, when a four cycle type is employed as illustrated in the drawings, it is not practicable to mix the lubricating oil with the fuel, as is usually done in the two cycle engines, and for this reason additional lubricating means must be provided. As shown I have divided the fuel tank 23 into two parts 23' and 23" (see Fig. 3), the part 23" being relatively small and serving to contain the lubricating oil. The lubricating oil is fed from the chamber 23" to the crank case of the engine by means of the feed pipe 23'''.

Since this disclosure will suggest to others modified structures whereby the substantial objects of my invention may be attained, I do not wish to be limited to the specific structure herein shown and described, except only as may be necessary by limitations in the hereunto appended claims.

I claim:—

1. A bicycle frame having rear wheel forks, a seat post fitting, a crank hanger, and a mast connecting the crank hanger and seat post fitting, said mast being yoke like intermediate its ends and opposite side portions thereof being formed with openings to receive an engine supporting member, said yoke like part having offset portions which are in a plane perpendicular to the central vertical longitudinal plane of the bicycle frame.

2. A motor bicycle comprising, in combination, a bicycle having a frame including rear forks, a rear drive wheel and a mast, an internal combustion engine carried by the bicycle frame and positioned in the central vertical plane of the mast, said mast being formed to accommodate the engine, and means carried by the engine and positioned to engage and drive the rear bicycle wheel.

3. A motor bicycle comprising, in combination, a bicycle having a frame including rear forks, a rear drive wheel and a mast, an internal combustion engine carried by the bicycle frame and positioned in the central vertical plane of the mast, said mast being formed to accommodate the engine, means carried by the engine and positioned to engage and drive the rear bicycle wheel, and means for moving the driving means into and out of driving relation to the rear bicycle wheel.

4. A motor bicycle comprising, in combination, a bicycle having a frame including rear forks, a rear drive wheel and a mast, an internal combustion engine carried by the bicycle frame and positioned in the central vertical plane of the mast, said mast being formed to accommodate the engine, and means carried by the engine and positioned to engage and drive the rear bicycle wheel, said internal combustion engine being self-contained and carrying fuel tank, carbureter, ignition and exhaust pipe.

5. A motor bicycle comprising, in combination, a bicycle having a frame including rear forks, a rear drive wheel and a mast, an internal combustion engine carried by the bicycle frame and positioned in the central vertical plane of the mast, said mast being formed to accommodate the engine, and means carried by the engine and positioned to engage and drive the rear bicycle wheel, said carrying means including a perforated lug on the engine, openings in the engine frame aligned with the opening in the perforated lug and a bolt passing through the lug and said aligned openings.

6. A motor bicycle comprising, in combination, a bicycle having a frame including rear forks, a rear drive wheel and a mast, said mast being formed with an offset portion which is in a plane perpendicular to the central vertical longitudinal plane of the bicycle frame to accommodate an internal combustion engine, an internal combustion engine supported from the frame and accommodated by said offset portion of the mast and carrying driving means positioned substantially in a plane passing vertically through the center of the mast and through the center of the rear bicycle drive wheel.

7. A self-contained internal combustion engine for attachment to a bicycle, means thereon formed to co-act with means on a bicycle frame for supporting it swingably therefrom, and carrying in self-contained relation fuel tank, carburetor, and ignition and a driving wheel operatively connected to receive rotary motion from the crank shaft of the engine.

8. A self-contained internal combustion engine for attachment to a bicycle, means thereon formed to co-act with means on a bicycle frame for supporting it swingably therefrom and carrying in self-contained relation fuel tank, carburetor, ignition, muffler, exhaust pipe leading away from the muffler and being attached adjacent its end to the engine, and a driving wheel operatively connected to receive rotary motion from the crank shaft of the engine.

9. A motor bicycle comprising a frame having rear fork members, rear driving wheel, a crank hanger, a seat post fitting, and a mast connecting the seat post fitting and the crank hanger and being offset along a portion of its length, in combination with an internal combustion engine pivotally mounted for swinging movement in the central vertical plane of the mast.

10. A motor bicycle comprising a frame having rear fork members, rear driving wheel, crank hanger, a seat post fitting, and a mast connecting the seat post fitting and the crank hanger and being offset along a portion of its length, in combination with an internal combustion engine carried by the mast and postioned in the central vertical plane thereof and having a portion extending rearwardly therefrom, said engine having a driving wheel operatively connected to the crank shaft of the engine and being supported by said rearwardly extending portion.

11. A motor bicycle comprising a frame having rear fork members, rear driving wheel, crank hanger, a seat post fitting, and a mast connecting the seat post fitting and the crank hanger and being offset along a portion of its length, in combination with an internal engine carried by the mast and positioned in the central vertical plane thereof, said engine having a plurality of driving wheels operatively connected to the crank shaft of the engine and positioned for engagement with the rear wheel of the bicycle.

12. A bicycle frame having rear wheel forks, a seat post fitting, a crank hanger, and a mast in the form of a separate member secured to and connecting said crank hanger and seat post fitting, said mast being offset from the central vertical plane of the frame along a portion of its length and in a plane substantially perpendicular to the central vertical longitudinal plane of the bicycle frame.

13. A bicycle frame having rear wheel forks, a seat post fitting, a crank hanger, a mast connecting said crank hanger and seat post fitting, said mast being offset from the central vertical plane of the frame along a portion of its length and in a plane substantially perpendicular to the central vertical longitudinal plane of the bicycle frame, and motor supporting means carried by said offset portion of the mast and extending in a direction substantially perpendicular to said vertical longitudinal plane of the bicycle frame.

14. A bicycle frame having rear wheel forks, a seat post fitting, a crank hanger and a mast connecting the crank hanger and the seat post fitting, said mast being yoke-like intermediate its ends, said yoke-like part having offset portions which are in a plane substantially perpendicular to the central vertical longitudinal plane of the bicycle frame, and motor supporting means carried by and extending between the offset portions of said yoke-like part.

15. A bicycle frame having rear wheel forks, a seat post fitting, a crank hanger and a mast connecting the crank hanger and the seat post fitting, said mast being yoke-like intermediate its ends, said yoke-like part having offset portions which are in a plane substantially perpendicular to the central vertical longitudinal plane of the bicycle frame, and motor supporting means detachably carried by and extending between offset portions of said yoke-like part.

In testimony whereof, I have hereunto set my hand this 25th day of November, 1918.

ERLE K. BAKER.